(12) United States Patent
Nakatsu et al.

(10) Patent No.: US 6,840,347 B2
(45) Date of Patent: Jan. 11, 2005

(54) VEHICLE STEERING APPARATUS

(75) Inventors: Masatoshi Nakatsu, Susono (JP); Junji Kawamuro, Susono (JP); Takahiro Kojo, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/619,080

(22) Filed: Jul. 15, 2003

(65) Prior Publication Data

US 2004/0070189 A1 Apr. 15, 2004

(30) Foreign Application Priority Data

Jul. 30, 2002 (JP) ........................................ 2002-221637
Jun. 4, 2003 (JP) ........................................ 2003-159832

(51) Int. Cl.[7] ............................................... B62D 5/04
(52) U.S. Cl. ........................................ 180/444; 180/446
(58) Field of Search ........................... 180/444, 446, 180/447; 74/388 PS (56) References Cited

U.S. PATENT DOCUMENTS 6,164,150 A * 12/2000 Shindo et al. .......... 74/388 PS
6,179,083 B1 * 1/2001 Yamauchi ................ 180/444
6,547,031 B1 * 4/2003 Magnus .................. 180/444
6,718,242 B1 * 4/2004 Mori et al. ................. 701/41

FOREIGN PATENT DOCUMENTS

JP    A 2001-48032    2/2001

* cited by examiner

*Primary Examiner*—Daniel G. DePumpo
(74) *Attorney, Agent, or Firm*—Oliff & Berridge, PLC (57) ABSTRACT

A vehicle steering apparatus is provided with a transmitting ratio variable gear ratio mechanism in a steering force transmitting system, and a lock mechanism which limits relative rotation between an input shaft and an output shaft of the steering force transmitting system. In the lock mechanism is provided a lock holder which rotates together with a rotor of a motor, and in which is formed a plurality of first indented portions in a circumferential direction along the circumference and a second indented portion indented deeper than the first indented portions at one end portion of each of the first indented portions. In the lock mechanism is also provided a lock arm which is provided on a stator side of the motor and which engages with the one of the first indented portions or second indented portions.

18 Claims, 11 Drawing Sheets

| DETECTING PORTION OUTPUT PATTERN | 1 | 2 | 3 | 4 | 5 | 6 | 1 | 2 | ... |
|---|---|---|---|---|---|---|---|---|---|
| OUTPUT OF SENSOR 12a | H | L | L | L | H | H | H | L | ... |
| OUTPUT OF SENSOR 12b | H | H | L | L | L | H | H | H | ... |
| OUTPUT OF SENSOR 12c | H | H | H | L | L | L | H | H | ... |

VEHICLE STEERING APPARATUS

INCORPORATION BY REFERENCE

The disclosure of Japanese Patent Application Nos. 2002-221637 filed on Jul. 30, 2002 and 2003-159832 filed on Jun. 4, 2003, each including the specification, drawings and abstract are incorporated herein by reference in their entireties.

BACKGROUND OF THE INVENTION

1. Field of the Invention

The invention relates to a vehicle steering apparatus provided with a lock mechanism.

2. Description of the Related Art

From Japanese Patent Laid-Open Publication No. 2001-48032 a vehicle steering apparatus having a lock mechanism is known. This apparatus is also provided with a variable gear ratio mechanism disposed midway in a steering shaft coupled to a steering wheel, which enables the ratio of an amount the steering wheel is turned to an amount steered wheels are turned to be changed. The lock mechanism restricts relative rotation of an input shaft and an output shaft of the variable gear ratio mechanism. This lock mechanism includes a lock holder provided on a rotor side of a motor housed within the variable gear ratio mechanism and a lock arm provided on a stator side of the motor. The lock mechanism locks by engaging the lock arm with an indented portion formed in the surface around the circumference of the lock holder.

This apparatus, however, may be unable to lock if the opening width of the indented portion of the lock holder is narrow. For example, when the apparatus attempts to lock when the motor is rotating, a locked state may be difficult to achieve if the indented portion of the lock holder is not provided at the engaging position of the lock arm.

It is conceivable that this problem can be solved by making the opening width of the indented portion wide. Widening the indented portion of the lock holder, however, results in an increased degree of play between the lock holder and the lock arm when they are in a locked state. As a result, the positional relationship between the lock holder and the lock arm is unable to be accurately detected such that appropriate steering control is unable to be performed.

SUMMARY OF THE INVENTION

It is an object of the invention to provide a vehicle steering apparatus that can detect a positional relationship of a lock holder and a lock arm in a lock mechanism in a locked state, thus enabling appropriate steering control.

A first aspect of the invention relates to a vehicle steering apparatus provided with variable gear ratio device having an input shaft coupled to a steering wheel side and an output shaft coupled to a steered wheel side, which changes a ratio of an angle input to the input shaft and an angle output to the output shaft by rotation of a motor, and a lock mechanism which restricts relative rotation of the input shaft and the output shaft. The lock mechanism includes a lock holder and an engaging member. The lock holder is provided on a rotor side of the motor and rotates together with the rotor. The lock holder has a plurality of first indented portions formed in a circumferential direction along the circumference thereof, and a plurality of second indented portions which are indented even deeper than the first indented portions. The second indented portion is formed at one end portion of each of the first indented portions. The engaging member of the lock mechanism is provided on a stator side of the motor and is able to move close to and away from the lock holder. The engaging member engages with one of the first indented portions or one of the second indented portions of the lock holder when it is operated so as to move close to the lock holder.

Accordingly, forming the second indented portion in one end portion of the first indented portion of the lock holder enables the engaging member that is engage with the first indented portion to further engage with the second indented portion. Engaging the engaging member with the second indented portion enables the position of the engaging member engaged with the first indented portion to be reliably detected.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Exemplary embodiments according to the invention will hereinafter be described in detail with reference to the appended drawings. In the description of the drawings, like elements will be denoted by like reference numerals and redundant descriptions thereof will be omitted.

First Exemplary Embodiment

Figure 1:
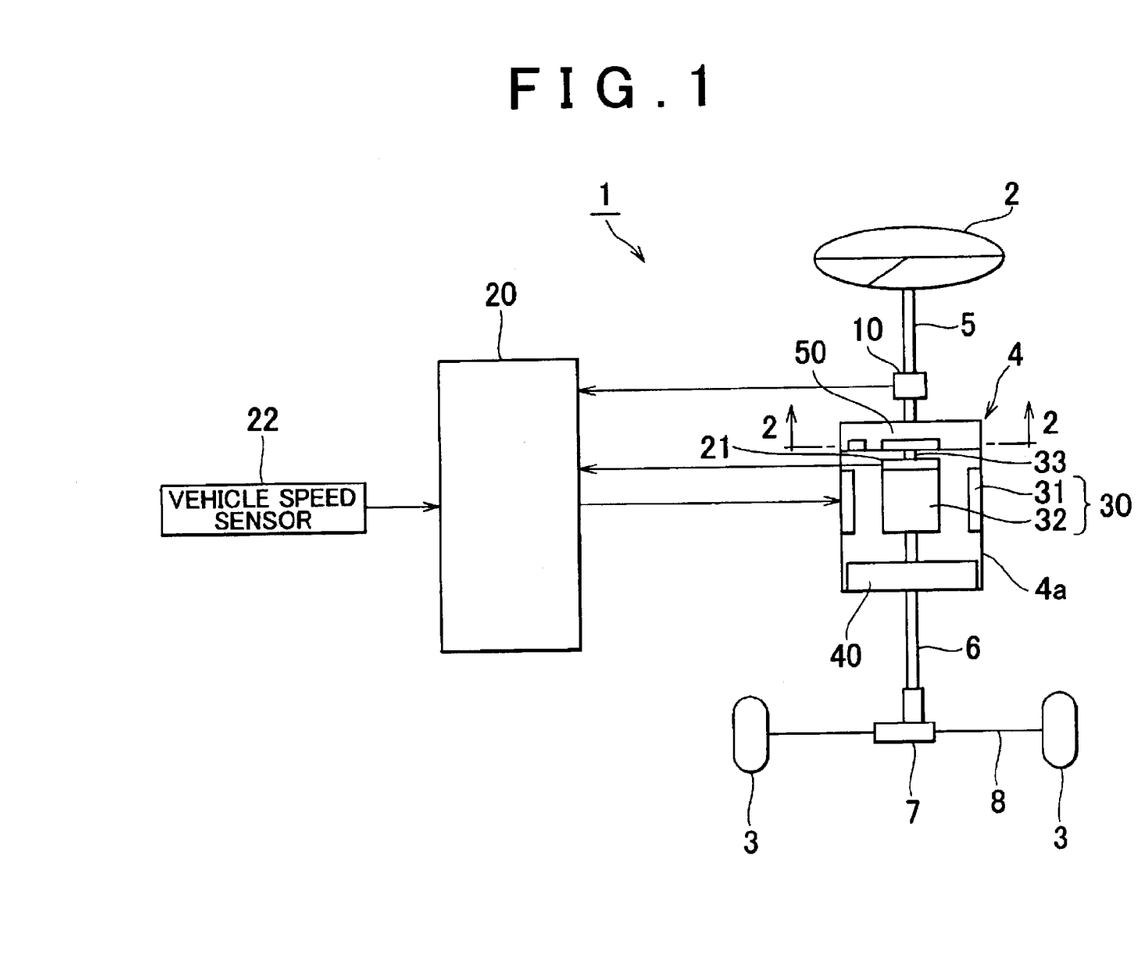
FIG. 1 is a block diagram of a vehicle steering apparatus according to a first exemplary embodiment of the invention.

FIG. 1 is a block diagram of a vehicle steering apparatus according to a first exemplary embodiment of the invention.

As shown in the drawing, a vehicle steering apparatus 1 is provided with a variable gear ratio mechanism 4 in a steering force transmission system which transmits steering force from a steering wheel 2 to steered wheels 3. The variable gear ratio mechanism 4 enables the steering ratio of the steering wheel steering amount (i.e., the ratio of the actual angle at which the steering wheel 2 is turned to the actual angle at which the steered wheels 3 are turned) to be changed. An input shaft 5 of the variable gear ratio mechanism 4 is connected to the steering wheel 2. Further, an output shaft 6 of the variable gear ratio mechanism 4 is connected to the steered wheels 3 via a gear assembly 7 which is, for example, a rack and pinion type gear assembly. The gear assembly 7 moves a tie rod 8 by rotational force input from the output shaft 6, thereby turning the steered wheels 3.

A steering angle sensor 10 is provided on the input shaft 5. This steering angle sensor 10 serves as steering angle detecting means for detecting a steering angle of the steering wheel 2 based on the rotational state of the input shaft 5. Also, a rotation sensor 21 is provided on the variable gear ratio mechanism 4. This rotation sensor 21 is a sensor that detects the rotational state, e.g., the rotational angle, of a rotating shaft 33 of the motor 30 housed in the variable gear ratio mechanism 4.

Detection signals from the steering angle sensor 10 and the rotation sensor 21 are input to a steering controller 20. This steering controller 20, which includes, for example, a CPU, ROM, RAM, an input signal circuit, an output signal circuit, and a power source circuit and the like, controls the entire vehicle steering apparatus 1. Further, a detection signal from a vehicle speed sensor 22 provided in the vehicle is input to the steering controller 20. The steering controller 20 controls the steering by outputting drive signals to the variable gear ratio mechanism 4 based on the detected signals from the steering angle sensor 10 and vehicle speed sensor 22 and the like and adjusting the steering ratio.

The variable gear ratio mechanism 4 houses a motor 30, reduction gears 40, and a lock mechanism 50. The motor 30 is an electric motor driven in accordance with a drive control signal from the steering controller 20. A stator 31 of the motor 30 is mounted to a housing 4a of the variable gear ratio mechanism 4. A rotor 32 of the motor 30 is connected to the output shaft 6 via the reduction gears 40. These reduction gears 40 are reducing means which reduces the rotational angle of the motor 30 input thereto and outputting the resultant rotational angle to the output shaft 6. Both the output from the reduction gears 40 and the steering force transmitted via the housing 4a are output to the output shaft 6. A planetary gearset, for example, may be used as the reduction gears 40.

Figure 2:
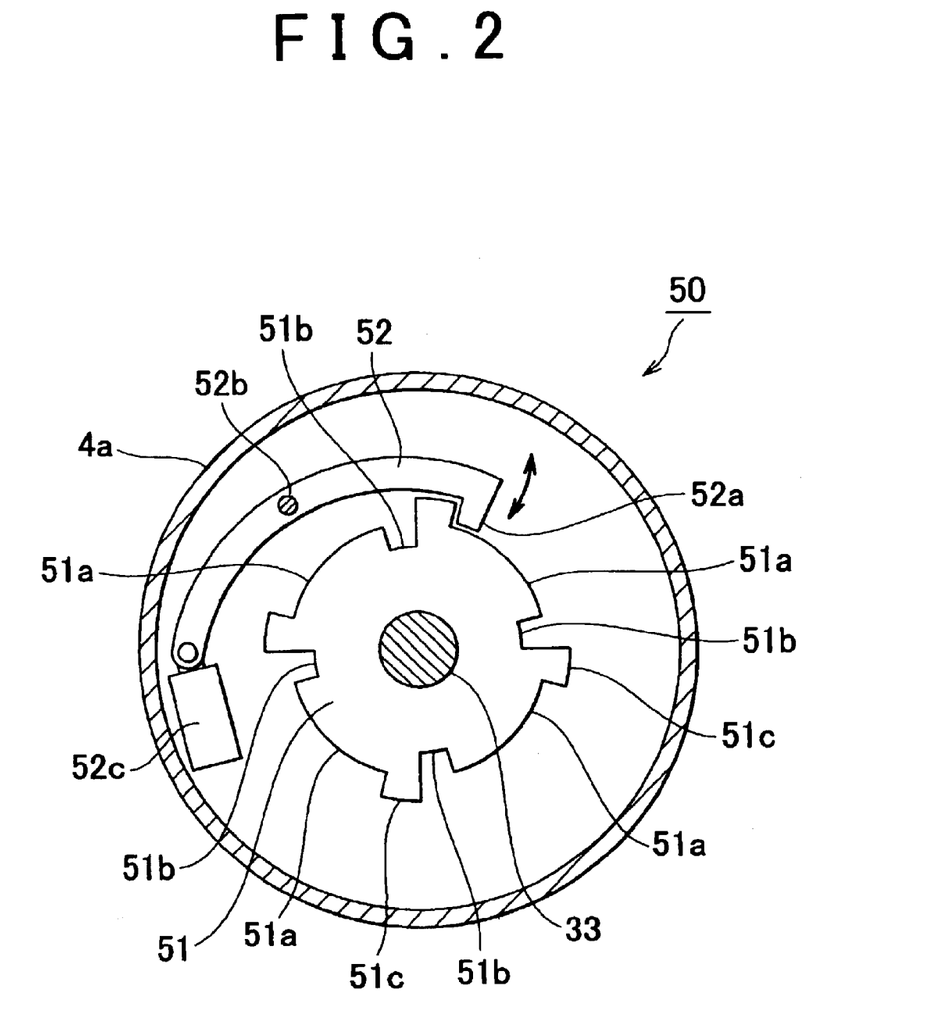
FIG. 2 is a explanatory view of a lock mechanism in the vehicle steering apparatus shown in FIG. 1.

FIG. 2 is a cross-sectional view of the lock mechanism taken along line 2—2 of FIG. 1. As shown in the drawing, the lock mechanism 50 is provided with a lock holder 51, which is mounted on the rotor 32 side of the motor 30, and a lock arm 52. This lock mechanism 50 prevents the relative rotation of the input shaft 5 and the output shaft 6 of the variable gear ratio mechanism 4.

The lock holder 51, for example, is mounted to the rotating shaft 33 of the motor 30 and rotates along with the rotor 32. It is preferable that the lock holder 51 be mounted to the rotating shaft 33 in such a way that it is not completely fixed thereto, but rather so as to be able to rotate relative to the rotating shaft 33 when it receives a torque equal to, or greater than, a predetermined value. In this case, the portion where the lock holder 51 is fixed to the rotating shaft 33 serves as a torque limiter so that damage to structural parts of the lock holder 51 and the lock arm 52 and the like can be avoided in the event that a torque equal to, or greater than, the predetermined value acts on lock holder 51 when the lock mechanism 50 is locked.

The outer periphery of the lock holder 51 is formed by a plurality of first indented portions 51a, second indented portions 51b, and protruding portions 51c (four each in this exemplary embodiment). The four first indented portions 51a are formed all having the same shape (width and depth) and equidistant from one another. The second indented portions 51b, which are indented deeper than the first indented portions 51a, are formed at end portions of the first indented portions 51a and are also formed all having the same shape (width and depth) and equidistant from one another. The directional position of each second indented portion 51b with respect to the adjacent first indented portion 51a is the same for all of the second indented portions 51b. The four protruding portions c, which protrude from the first indented portions 51a are also all formed having the same shape (width and height) and equidistant from each other. For the sake of simplicity, the first indented portions 51a, the second indented portions 51b, and the protruding portions 51c will be referred to in the singular form in the following description.

It is preferable that the second indented portion 51b be formed in a position such that the lock arm 52 moves to the second indented portion 51b side of the first indented portion 51a from the other end side thereof when the steering wheel 2 is turned to the left. In this case, when a driver of the vehicle operates a key to start the engine or the like with the right hand, it is easier to turn the steering wheel 2 to the left than to the right with the left hand. Therefore, forming the second indented portion 51b in the position described above facilitates engagement of an engaging portion 52a, which will be described later, with the second indented portion 51b when the driver turns on an ignition switch (hereinafter referred to as "IG"). That is, when a key cylinder is provided on the right side of the steering wheel 2, the driver will use the left hand to turn the steering wheel, so it is preferable that the second indented portion 51b be formed in the position shown in FIG. 2. On the other hand, when the key cylinder is provided on the left side of the steering wheel, the driver will use the right hand to turn the steering wheel, so it is preferable that the second indented portion 51b be formed at the other end of the first indented portion 51a, i.e., at the end of the first indented portion 51a that is opposite the end where the second indented portion 51b is formed in FIG. 2.

The lock arm 52 is an engaging member which is constructed so as to be able to move close to, as well as away from, the lock holder 51. When the lock arm 52 is moved close to the lock holder 51, the lock arm 52 is able to engage with the first indented portion 51a and the second indented portion 51b. The lock arm 52 is mounted on the stator 31 side of the motor 30, e.g., to the housing 4a to which the stator 31 is mounted.

The engaging portion 52a is hook shaped and is formed at a tip of the lock arm 52. A pin 52b, around which the lock arm 52 can rotate, is provided in a central location of the lock arm 52. Also, at a base end position of the lock arm 52 on the side opposite the engaging portion 52a is a solenoid 52c. Operation of the solenoid 52c moves the base end position of the lock arm 52, thereby rotating the lock arm 52. As a result, the engaging portion 52a is engaged with the first indented portion 51a or the second indented portion 51b such that the lock arm 52 is engaged with the lock holder 51, thereby locking the lock mechanism 50.

Figure 3:
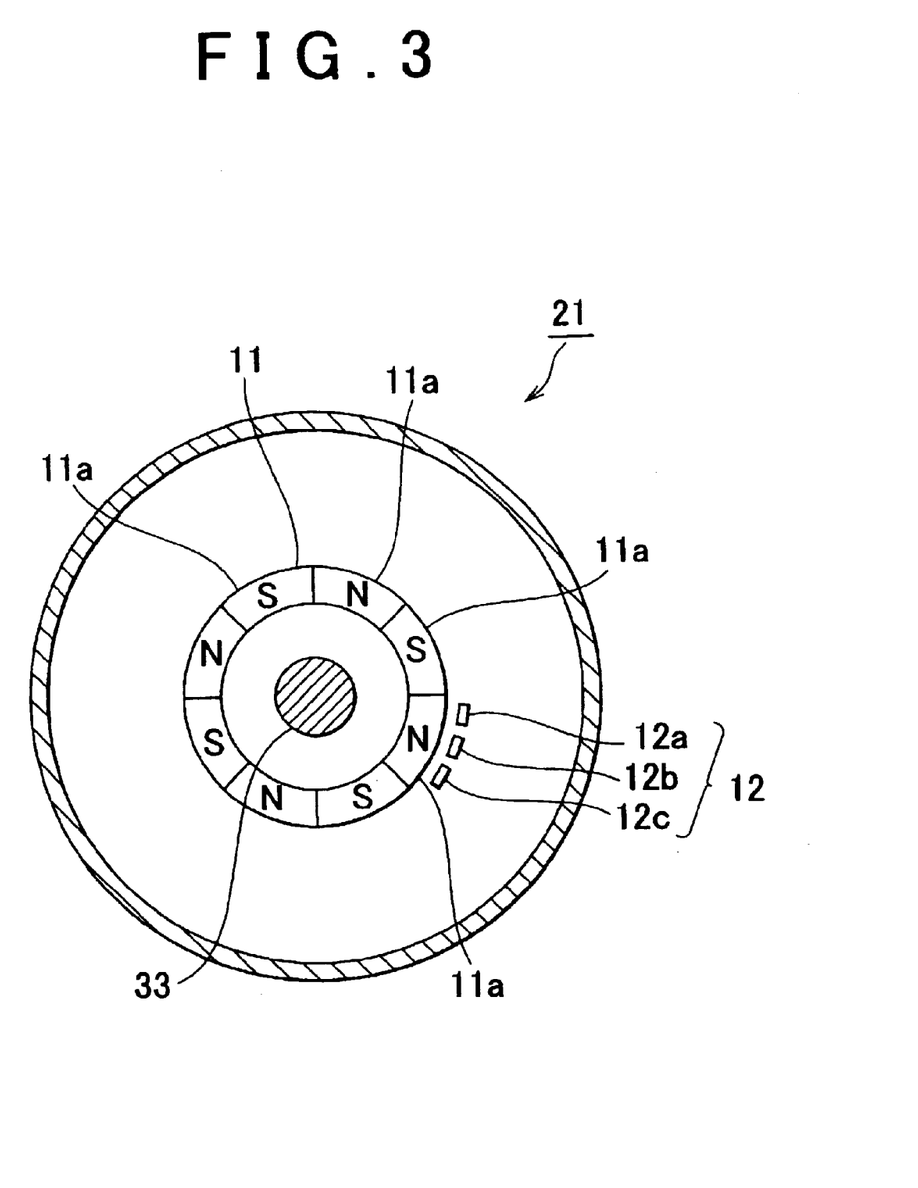
FIG. 3 is an explanatory view of a steering angle sensor in the vehicle steering apparatus shown in FIG. 1.

FIG. 3 is an outline view of the construction of the rotation sensor 21.

As shown in the drawing, the rotation sensor 21 includes a rotor portion 11, which rotates integrally with the rotating shaft 33 of the motor 30, and a detecting portion 12 arranged around the circumference of the rotor portion 11. This rotor portion 11 is ring-shaped and is provided around the outside of the rotating shaft 33 so as to rotate together therewith. A plurality of magnets are arranged in the rotor portion 11 in the circumferential direction thereof. For example, magnets may be arranged such that eight magnetic poles 11a of the magnets are arranged as shown in FIG. 3. The rotor portion 11 of the rotation sensor 21 and the lock holder 51 of the lock mechanism 50 rotate together via the rotating shaft 33 so that relative rotation thereof does not occur during normal operation.

The magnetic poles 11a of each magnet are provided so as to create alternating different magnetic fields toward the detecting portion 12 when the rotor portion 11 rotates, e.g., so as to create magnetic fields in different directions. As a result, the magnetic field around the detecting portion 12 changes by rotating the rotor portion 11 together with the rotating shaft 33. In the case where the rotor portion 11 has the eight magnetic poles 11a of the magnets, the magnetic field changes one cycle every time the rotor portion 11 rotates 90 degrees. The positional relationship between the rotor portion 11 and the lock holder 51 will be described in detail later, but because each protruding portion 51c is at a 90 degree angle from each adjacent protruding portion 51c, the magnetic field of the magnets on the rotor portion 11 also changes one cycle every time the protruding portion 51c rotates 90 degrees. Because of the relationship between the magnetic pole 11a of the magnets and the detecting portion 12, it is preferable that the position at which the sensor output pattern changes correspond to the position of the wall face of the first indented portion 51a of the lock holder 51.

The detecting portion 12 is provided with three magnetic sensors 12a to 12c, for example, by which it detects the rotational position of the rotating shaft 33 based on the change in the magnetic field. These magnetic sensors 12a to 12c, each of which is connected to the steering controller 20 (see FIG. 1), are arranged along the periphery of the rotor portion 11 such that the interval between the centers of adjacent magnetic sensors (e.g., 12a, 12b) is equivalent to one third of an outer periphery portion of one magnetic pole 25a.

Therefore, the output of the detecting portion 12 changes each time the rotor portion 11 rotates one-third the length of the magnetic pole 11a. Accordingly, the output pattern of the detecting portion 12 changes every time the rotating shaft 33 rotates 15 degrees (i.e., 360/(8×3) degrees). As a result, it is possible to detect the rotational position of the rotating shaft 33 with a resolution of 15 degrees.

Figure 4:
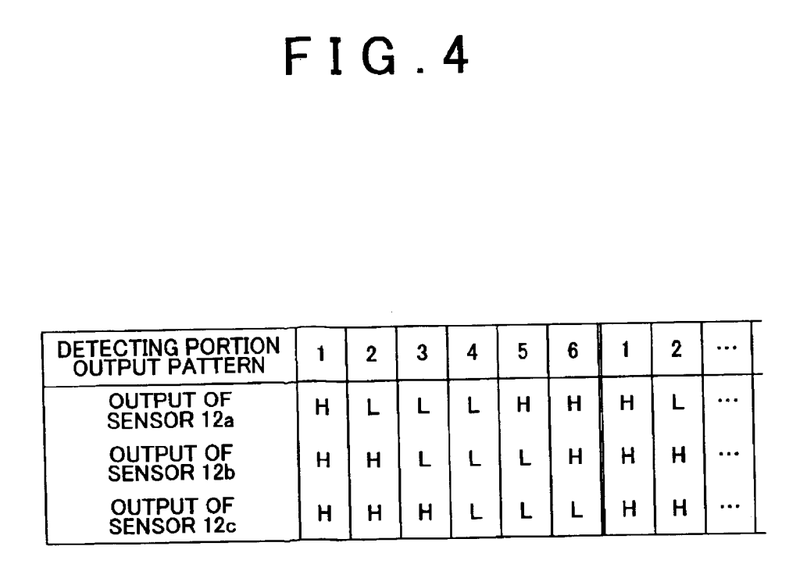
FIG. 4 is an explanatory view of an output pattern detected by the steering angle sensor in the vehicle steering apparatus shown in FIG. 1.

FIG. 4 shows the detection signals of the detecting portion 12 in detail.

As shown in the drawing, the rotation sensor 21 repeatedly outputs in sequence detection signals by a predetermined number, e.g., six, of different output patterns as the rotating shaft 33 rotates. That is, the predetermined number of detection signals are all different from one another. In FIG. 3, every time the position of the same magnetic pole 11a of the rotor portion 11 corresponds with the position of the magnetic sensors 12a to 12c, the output of the magnetic sensors 12a to 12c is the same, e.g., all of the outputs become high (H) (output pattern 1 in FIG. 4). When the rotor portion 11 is turned to the right, the magnetic pole 11a of the magnet moves close to the magnetic sensor 12a. As a result, the output of the magnetic sensor 12a only becomes low (L) (output pattern 2). Then as the rotor portion 11 is rotated further, the outputs of the magnetic sensors 12b and the 12c also become low (L) in succession (output pattern 3).

The outputs of the magnetic sensors 12a to 12c change when the rotor portion 11 rotates such that the output pattern of the detecting portion 12 becomes like those of output patterns 5 and 6 shown in FIG. 4. When the rotor portion 11 is rotated further, the output pattern of the detecting portion 12 returns to output pattern 1 and then changes again sequentially to output patterns 2 and 3 and so on.

The change cycle of the output patterns 1 to 6 depends on the arrangement of the magnetic poles 11a of the magnets on the rotor portion 11. When a S pole and a N pole, which are two magnetic poles 11a of the magnet, are arranged such that together they occupy a region of the circumference of the rotor portion 11 which corresponds to 90 degrees of that entire circumference, as shown in FIG. 3, the change in the output pattern of the detecting portion 12 is one cycle for every 90 degrees of rotation of the rotor portion 11.

Figure 5:
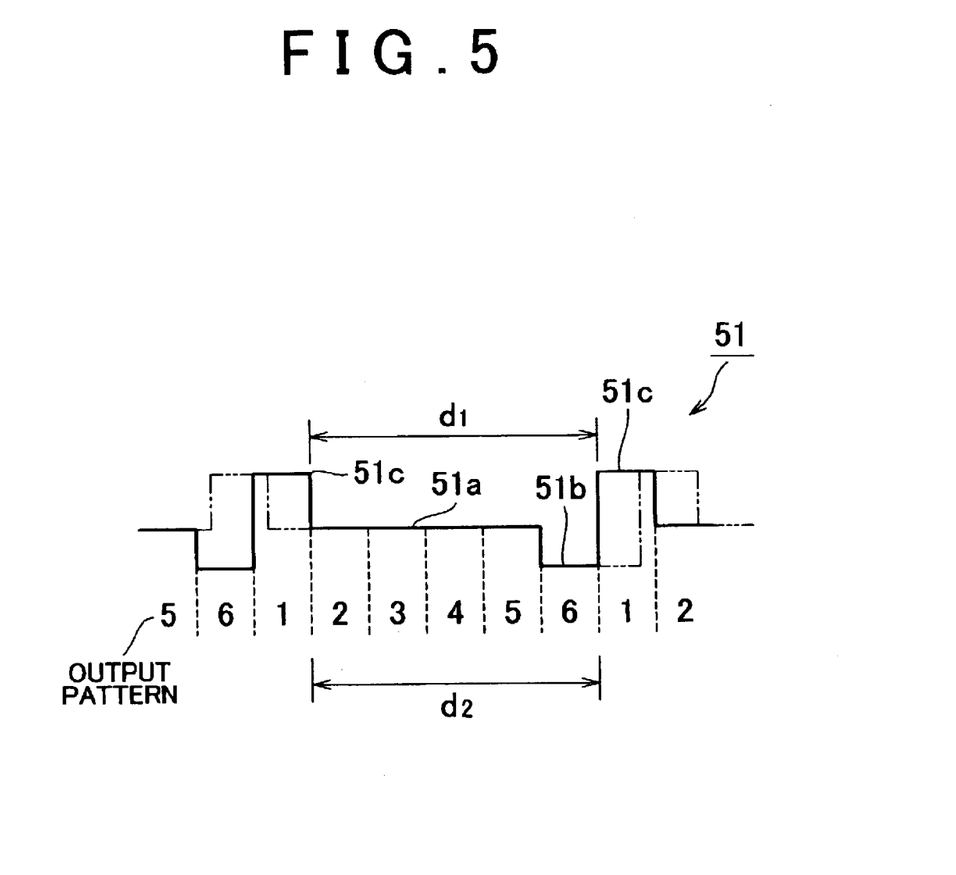
FIG. 5 is a projection view of a lock holder in the vehicle steering apparatus shown in FIG. 1.

FIG. 5 is a projection view showing the outer peripheral portion of the cylindrical lock holder 51, together with the corresponding output patterns of the rotation sensor 21. In the drawing, a width W is not shown for the engaging portion 52a of the lock arm 52 to facilitate understanding. d1 in FIG. 5 is a representational value of an angle of play when the engaging portion 52a is inserted into the first indented portion 51a. That is, when the engaging portion 52a is contacting one end portion of the first indented portion 51a, the angle of play is an angle formed between a face of the engaging portion 52a that is not contacting the first indented portion 51a and a face of the other end portion of the first indented portion 51a. The angle of play is determined by adjusting either the width (W) of the engaging portion 52a of the lock arm 52 or the width (W1) of the first indented portion 51a.

As shown in FIG. 5, it is possible to detect the position of the protruding portion 51c and the second indented portion 51b of the lock holder 51 based on the output pattern by presetting the positional relationship between the lock holder 51 and the rotor portion 11.

If the angle (i.e., width) of the first indented portion 51a is equal to, or greater than, the maximum value of the rotational angle of the motor 30 that is necessary for all of the plurality of different detection signals to be output (90 degrees in this exemplary embodiment), as shown by the double dashed line in FIG. 5, there is a possibility that the output pattern 1 of the rotation sensor 21 may be detected at two locations: the protruding portion 51c on the right side and the protruding portion 51c on the left side. If this happens, the steering controller 20 can not accurately detect the position of the lock holder 51 and thus the control accuracy would decline.

On the other hand, if the width of the first indented portion 51a is narrow, the position of the lock holder 51 can be detected very accurately but operability of the lock mechanism 50 would be reduced because the width of the area into which the engaging portion 52a can be inserted is narrow. Therefore, in order to ensure both insertability of the lock mechanism 50 and detectability of the position of the lock holder 51, i.e., detectability of the rotational position of the rotating shaft 33 of the motor 30, it is preferable to make the angle of play d1 when the engaging portion 52a is inserted into the first indented portion 51a less than the minimum value d2 of a rotational angle of the motor 30 which is necessary for outputting all of the plurality of different detection signals in the rotation sensor 21. In FIG. 5, because the width W of the engaging portion 52a is not shown, the angle of play d2 is shown as 75 degrees. In actuality, however, the angle of play d2 is the difference of 75 degrees plus the angle corresponding to the width W of the engaging portion 52a.

Figure 6:
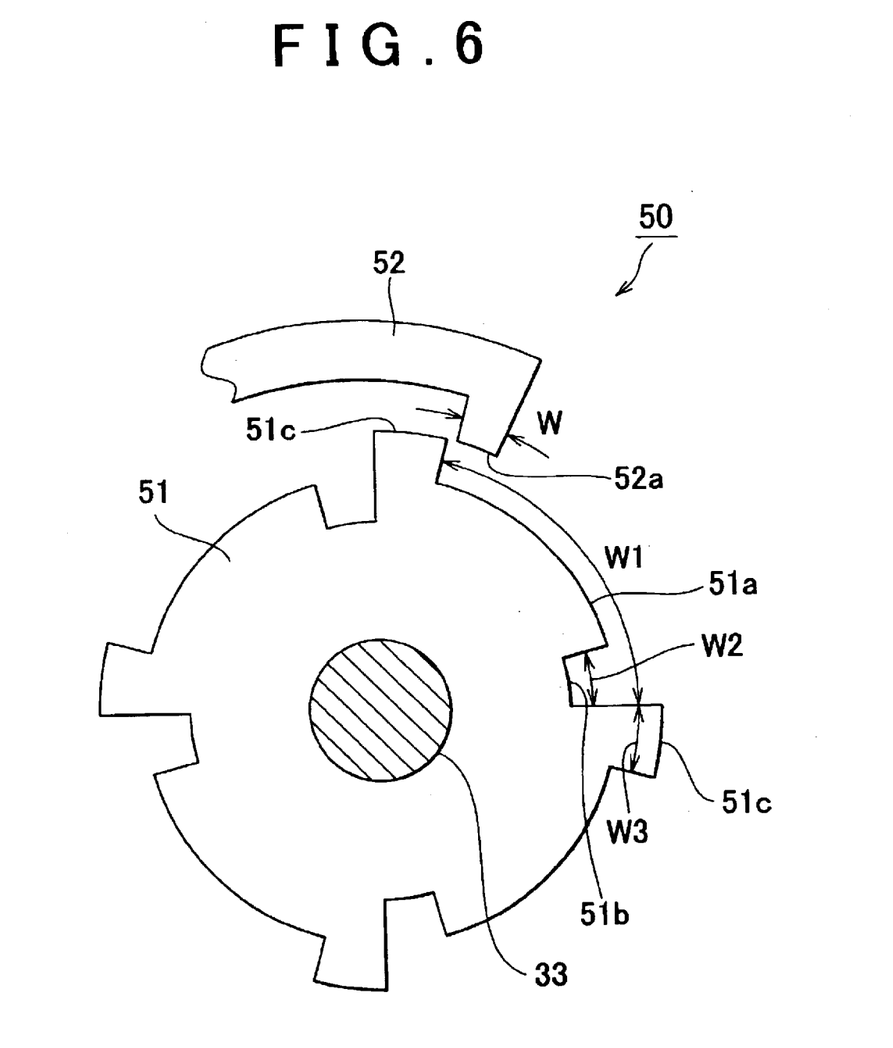
FIG. 6 is an expanded view of the lock mechanism in the vehicle steering apparatus shown in FIG. 1.

FIG. 6 is an enlarged view of the lock mechanism 50.

As shown in the drawing, an opening width W1 in the circumferential direction of the first indented portion 51a of the lock holder 51 is formed larger than a width W3 of the protruding portion 51c. Preferably, the opening width W1 of the first indented portion 51a is formed two or more times wider than the width W3 of the protruding portion 51c. Then, the opening width W1 of the first indented portion 51a is formed sufficiently wider than the width W of the engaging portion 52a of the lock arm 52. As a result, the engaging portion 52a of the lock arm 52 easily fits into the first indented portion 51a such that the lock arm 52 and the lock holder 51 reliably engage thus enabling locking even while the steering wheel is being turned.

Also, the first indented portion 51a is formed corresponding to the change cycle of the magnetic field of the rotor portion 11. For example, the angle of the opening width W1 of the first indented portion 51a together with the width W3 of the protruding portion 51c (i.e., the interval of two adjacent protruding portions 51c) is 90 degrees, which is the change cycle of the magnetic field of the rotor portion 11. Therefore, when the engaging portion 52a is engaged with the first indented portion 51a, the relationship between the engaged position of the engaging portion 52a and the rotational position of the rotating shaft 33 of the motor 30 is able to be detected based on the output from the rotation sensor 21.

The second indented portion 51b is formed such that the opening width W2 in the circumferential direction is narrower than the opening width W1 of the first indented portion 51a, and the engaging portion 52a fits into the second indented portion 51b with little play. That is, the opening width W2 of the second indented portion 51b is set to a width that restricts the degree of play between the engaging portion 52a and the second indented portion 51b, such that the change in the detection output of the rotation sensor 21 when the engaging portion 52a of the lock arm 52 is engaged with the second indented portion 51b is less than it is when the engaging portion 52a is engaged with the first indented portion 51a. In contrast, the opening width W1 of the first indented portion 51a is set to a width that allows play between the engaging portion 52a and the first indented portion 51a to a degree where the detection output of the rotation sensor 21 changes when the engaging portion 52a is engaged with the first indented portion 51a.

Next, operation of the vehicle steering apparatus according to the exemplary embodiment will hereinafter be described.

In FIG. 1, a lock release signal is output to the variable gear ratio mechanism 4 from the steering controller 20 when the ignition switch of the vehicle is turned on. As a result, the solenoid 52c is activated so as to rotate the lock arm 52 on the pin 52b and bring the engaging portion 52a away from the lock holder 51, thereby releasing the lock mechanism 50 from its locked state.

For example, when the output pattern of the rotation sensor 21 is stored as "3" when the IG is turned off and as "6" when the lock mechanism 50 is released from its locked state, it is evident that control starts with the output pattern of the rotation sensor 21 being off by three. This type of offsetting of the sensor output pattern occurs when the steering wheel is turned while the IG is off. However, even if the engine is started in this state (i.e., when the output pattern of the rotation sensor 21 is off), the motor position can be accurately detected and control of the motor rotational angle can be accurately performed. Accordingly, the continuity of the control can be ensured and control accuracy can be improved. In this case, the motor position when the engine is started can be accurately detected based on the sensor output pattern because the angle of play d1, which is determined by the width W1 of the first indented portion 51a of the lock holder 51 and the width W of the engaging portion 52a of the lock arm 52, is less than, the minimum value d2 of the rotational angle of the motor 30 that is required for the plurality of different detection signals to all be output by the rotation sensor 21.

Figure 7:
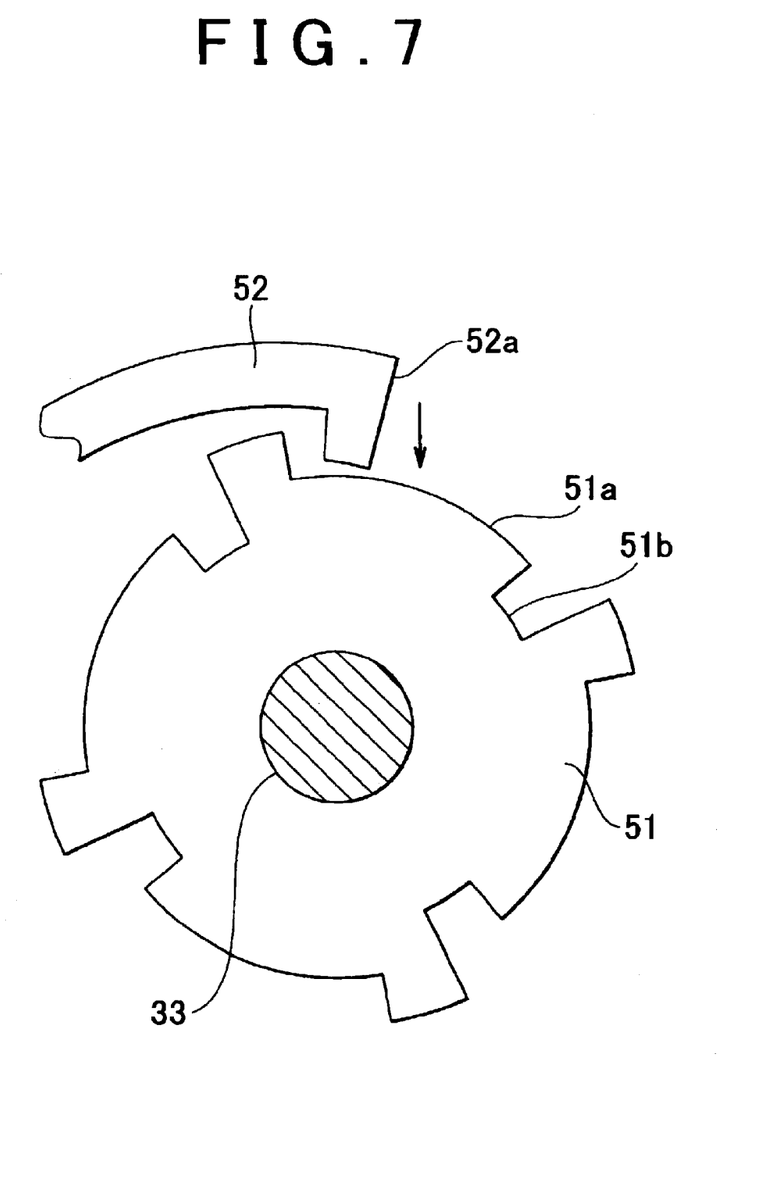
FIG. 7 is an explanatory view of the operation in the vehicle steering apparatus shown in FIG. 1.

Meanwhile, a lock activating signal is output to the variable gear ratio mechanism 4 from the steering controller 20 when the IG of the vehicle is turned off or the like. As a result, the lock arm 52 rotates so that the engaging portion 52a comes close to the lock holder 51, as shown in FIG. 7. The engaging portion 52a then fits into the first indented portion 51a such that the lock arm 52 and the lock holder 51 engage, thereby locking the lock mechanism 50.

The foregoing description assumes that the relationship between the output patterns 1 to 6 of the rotation sensor 21 and the shape of the lock holder 51 is already known. There are cases as described above, however, where the position of the lock holder 51 is not known. For example, there are cases where the position of the lock holder 51 is off, or where the mounting position of the lock holder 51 is not known, or where the data for the positional relationship between the lock holder 51 and the lock arm 52 in the memory portion of the steering controller 20 has changed.

In cases such as these when the position of the lock holder 51 is not known, the following learning control is performed. That is, while the lock arm 52 is inserted, the motor 30 is operated so as to rotate as far as it will go in a certain direction and the point at which the lock holder 51 is no longer able to move is determined. At that point, it is then determined whether the motor 30 can rotate in the opposite direction. More specifically, when the motor 30 is operated so as to rotate and the output pattern of the rotation sensor 21 changes, it is determined that the lock arm 52 is engaged with the first indented portion 51a, i.e., rotation is possible. Conversely, when the motor is operate so as to rotate and the output pattern of the rotation sensor 21 does not change, it is determined that the lock arm 52 is engaged with the second indented portion 51b, i.e., rotation is not possible.

When the lock arm 52 is engaged with the first indented portion 51a, i.e., rotation is possible, it is evident that the lock arm 52 abuts against a wall portion (see FIG. 7) on the right side of the protruding portion 51c of the lock holder 51, i.e., the lock arm 52 is in the first indented portion 51a. In this case, it is determined that the lock arm 52 is engaged with the first indented portion 51a. On the other hand, when the lock arm 52 is engaged with the second indented portion 51b, i.e., rotation is not possible, it is evident that the lock arm 52 abuts against a wall portion (see FIG. 7) on the left side of the protruding portion 51c of the lock holder 51, i.e., the lock arm 52 is in the second indented portion 51b. In this case, it is determined that the lock arm 52 is engaged with the second indented portion 51b. The the positional relationship between the sensor output pattern and the lock holder 51 can then be determined from a number of changes of the output pattern of the rotation sensor 21 at this time and a position of the first indented portion 51a or second indented portion 51b.

Performing the learning control upon shipping of the vehicle from the plant obviates the need to fix the position of the lock holder 51 to a predetermined position. Further, when it is thought that the sensor output pattern may be offset when the vehicle starts to be driven, the controllability of the vehicle steering apparatus can be improved by performing the learning described above. In this way, with the vehicle steering apparatus 1 according to the first exemplary embodiment, by forming the second indented portion 51b in one end portion of the first indented portion 51a it is possible to retain the engaging portion 52a in the second indented portion 51b by rotating the lock holder 51 relative to the lock arm 52, or the like, when locking the lock mechanism 50. Accordingly, it is possible to detect which end portion, of the two end portions of the first indented portion 51a, the engaging portion 52a is positioned at. Further, the positional relationship between the lock holder 51 and the lock arm 52 is able to be detected by outputs and the like from the rotation sensor 21. As a result, because the lock holder 51 is coupled to the rotating shaft 33 and the lock arm 52 is coupled to the steering wheel 2 via the housing 4a and the input shaft 5, the relationship between the steering position of the steering wheel 2 and the rotational position of the rotating shaft 33 of the motor 30 can be detected. Accordingly, steering control that changes the steering ratio can be performed appropriately.

Second Exemplary Embodiment

Hereinafter, a vehicle steering apparatus according to a second exemplary embodiment will be described.

The vehicle steering apparatus according to this second exemplary embodiment has substantially the same construction as the vehicle steering apparatus according to the first exemplary embodiment. The vehicle steering apparatus according to the second exemplary embodiment differs from the vehicle steering apparatus according to the first exemplary embodiment, however, with respect to the opening width in the circumferential direction of the second indented portion 51b in the lock holder 51.

Figure 9:
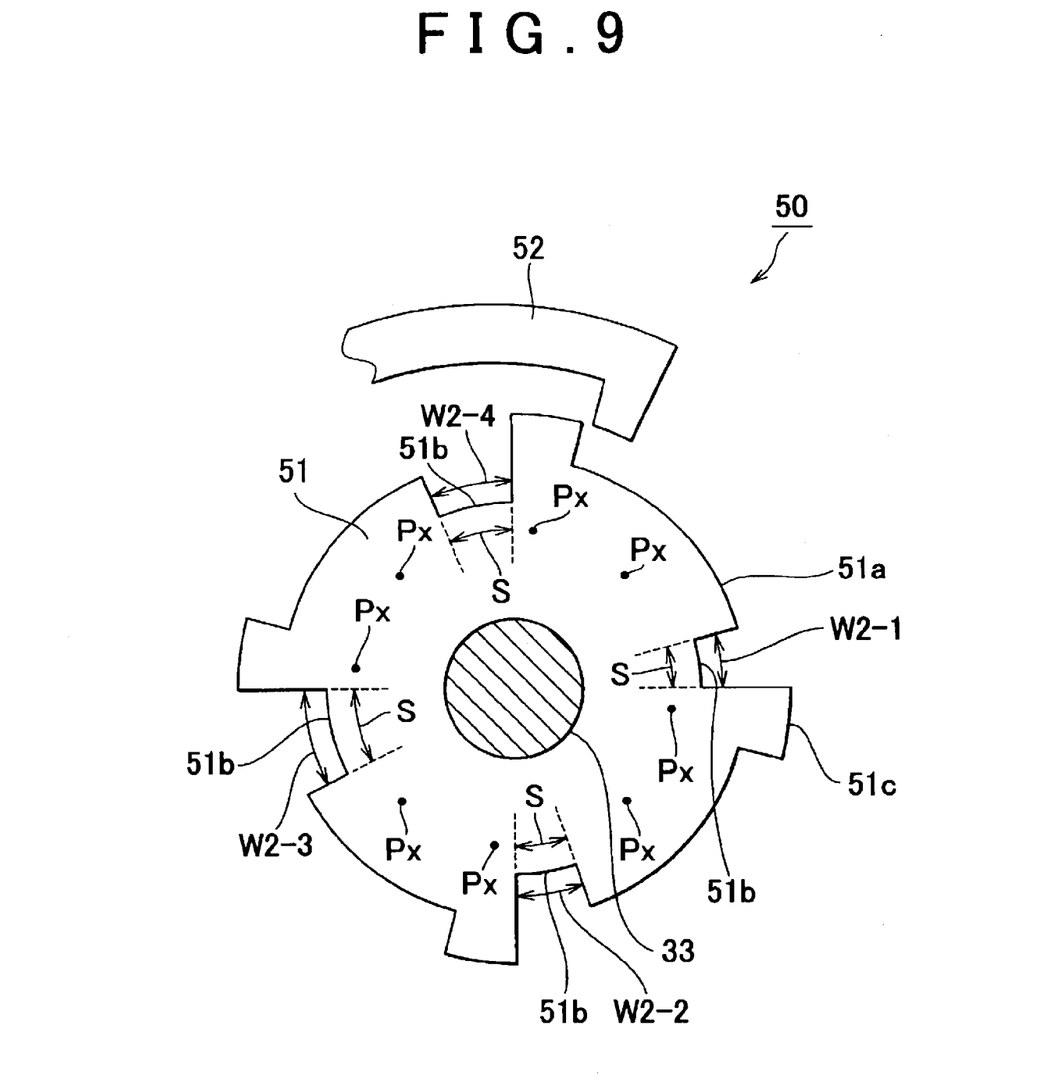
FIG. 9 is an explanatory view of a vehicle steering apparatus according to a second exemplary embodiment of the invention.

FIG. 9 shows a lock holder of the vehicle steering apparatus according to the second exemplary embodiment.

As shown in the drawing, at least one of the second indented portions 51b of the lock holder 51 is formed such that the dimensions of its opening width W2 in the circumferential direction are different from the opening width W2 of another of the second indented portions 51b. For example, the second indented portion 51b of the lock holder 51 may be formed such that the opening widths W2-1, W2-2, W2-3, and W2-4 in the circumferential direction are all different.

By forming the second indented portions 51b in this way, when the lock arm 52 is engaged with one of the second indented portions 51b it is possible to detect which second indented portion 51b the lock arm 52 is engaged with. That is, when the lock arm 52 is engaged with one of the second indented portions 51b, the motor 30 is driven and the engaging position of the lock arm 52 is detected based on the changes of the detection signal being output from the rotation sensor 21 at that time.

More specifically, the motor 30 is rotated as far as possible in both a predetermined direction and in the opposite direction. At this time, when the lock arm 52 is engaged with the second indented portion 51b having a narrow opening width W2, the degree of change in the output of the rotation sensor 21 during normal or reverse rotation of the motor 30 is small (e.g., when using a resolver, to be described later, as the rotation sensor 21, difference between an output value indicative of when the motor 30 is in a position in which it has been rotated as far as possible in a predetermined direction and another output value indicative of when the motor is in a position in which it has been rotated as far as possible in the opposite direction, is less than a predetermined value). Conversely, when the lock arm 52 is engaged with the second indented portion 51b having a wide opening width W2, the degree of change in the output of the rotation sensor 21 is large (i.e., difference between an output value indicative of when the motor 30 is in a position in which it has been rotated as far as possible in a predetermined direction and another output value indicative of when the motor is in a position in which is has been rotated as far as possible in the opposite direction, is equal to, or greater than, a predetermined value). Further, in this exemplary embodiment, because the widths of the four second indented portions 51b are different, it is possible to identify which second indented portion 51b the lock arm 52 is engaged with by determining which maximum value where change in the output value is allowed in the second indented portion 51b the change in the output value of the rotation sensor 21 corresponds with. Accordingly, even when the electrical system is temporarily interrupted when the motor 30 is running at high speeds, such that the sensor output is skipped, it is still possible to detect the positional relationship between the lock holder 51 and the lock arm 52, as well as the relationship between the steering position of the steering wheel 2 and the rotational position of the rotating shaft 33 around the entire 360 degrees of the circumference. As a result, the steering control for changing the steering ratio is able to be performed appropriately.

The relationship between the steering position of the steering wheel 2 and the rotational position of the rotating shaft 33 when the sensor output is skipped is corrected by a method such as the following. A comparison is made between i) a case in which a correction value is added to the output value of the rotation sensor 21 of just before the sensor output is skipped and the resulting value is made the new output value of the rotation sensor 21 (i.e., an addition correction), and ii) a case in which a correction value is subtracted from the output value of the rotation sensor 21 of just before the sensor output is skipped and the resulting value is made the new output value of the rotation sensor 21 (i.e., a reduction correction). When the addition correction value is equal to, or less than, the reduction correction value, the addition correction is performed. On the other hand, when the addition correction value is not equal to, or less than, the reduction correction value, the reduction correction is performed. Also, whether to make an addition correction or a subtraction correction may also be determined based on the current steering wheel torque and the turning speed.

In the vehicle steering apparatus according to the exemplary embodiment, it is preferable to use a resolver as the rotation sensor 21. The resolver serves as the rotation detecting means for outputting a sine signal and a cosine signal as the motor 30 rotates. This resolver can detect an extremely small rotational angle.

Figure 10:
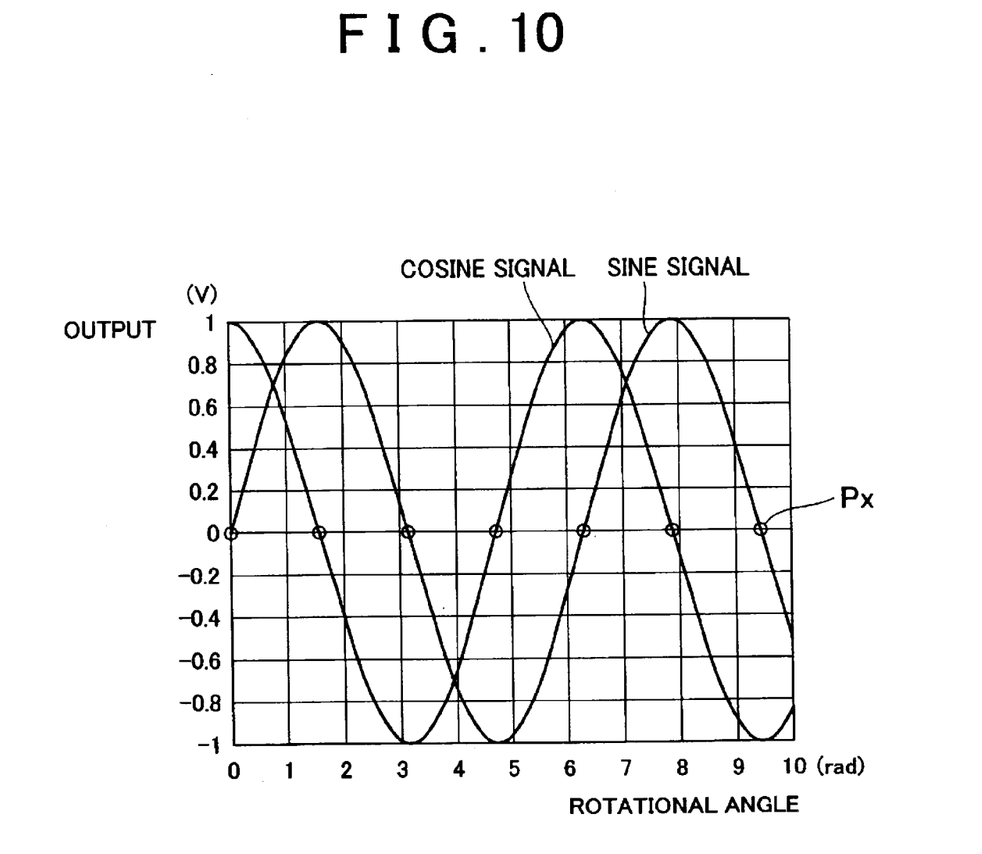
FIG. 10 is an explanatory view of output characteristics of a rotation sensor in the vehicle steering apparatus shown in FIG. 9.

As shown in FIG. 10, there is a predetermined rotational angle of the rotating shaft 33 which the resolver is unable to detect. In the drawing, this undetectable rotational angle is where the sine or cosine signal is zero. For example, when detecting the rotational angle by comparing the sine and cosine signals, the resolver is not able to accurately identify the rotational angle when the sine signal or cosine signal is zero.

Therefore, as shown in FIG. 9, it is preferable to set a rotational position Px of the rotating shaft 33 where the rotational angle thereof is undetectable, i.e., where the sign signal or the cosine signal is zero, so that it does not fall in a rotational range S within which the lock arm 52 engages with the second indented portion 51b. According to this construction, when the lock arm 52 is engaged with the second indented portion 51b, it is possible to reliably detect the engaging position of the lock arm 52 based on the output of the rotation sensor 21 during normal or reverse rotation of the motor 30.

Also, increasing the resolution of the rotation sensor 21 of the first exemplary embodiment makes it possible to determine which second indented portion 51b the lock arm 52 is engaged with, as in the second exemplary embodiment, from the number of output patterns that change in the second indented portion 51b.

Further, with the vehicle steering apparatus according to the second exemplary embodiment, when the position of the lock holder 51 is off and the positional relationship of the output value of the rotation sensor 21 and the lock holder 51 is not known, it is possible to detect the position of the lock holder 51, just as with the vehicle steering apparatus according to the first exemplary embodiment described above. That is, while the lock arm 52 is inserted into the first indented portion 51a or the second indented portion 51b, the motor 30 is rotated as far as it will go in a certain direction and the point at which the lock holder 51 is no longer able to move is determined. At that point, the degree to which the motor 30 can rotate in the opposite direction is then determined. More specifically, when the motor 30 is operated so as to rotate and the output pattern of the rotation sensor 21 changes to equal to, or greater than, a predetermined value, it is evident that the lock arm 52 is in the first indented portion 51a. In this case, it is determined that the lock arm 52 is engaged with the first indented portion 51a. Conversely, when the motor is operated so as to rotate and the output value of the rotation sensor 21 changes less than the predetermined value, it is evident that the lock arm 52 is in the second indented portion 51b. In this case, it is determined that the lock arm 52 is engaged with the second indented portion 51b. The positional relationship between the sensor output pattern and the lock holder 51 can then be determined from the relationship between the output pattern of the rotation sensor 21 at this time and the first indented portion 51a or second indented portion 51b.

Third Exemplary Embodiment

Next, a vehicle steering apparatus according to a third exemplary embodiment will be described.

The vehicle steering apparatus according to this third exemplary embodiment has substantially the same construction as the vehicle steering apparatuses according to the first and second exemplary embodiments. The vehicle steering apparatus according to the third exemplary embodiment differs from the vehicle steering apparatuses according to the first and second exemplary embodiments, however, in that the opening width W2 of the second indented portion 51b of the lock holder 51 gradually becomes narrower in the axial direction of the rotating shaft 33 of the motor 30.

Figure 8:
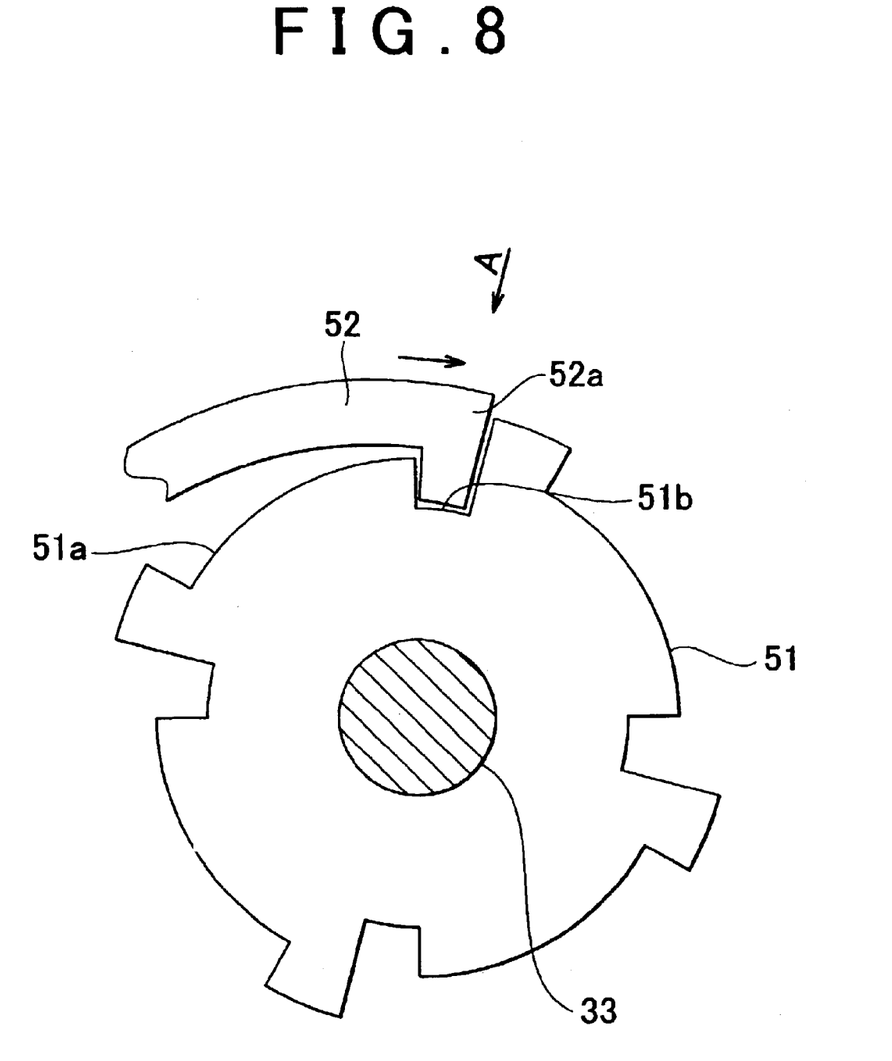
FIG. 8 is an explanatory view of the operation in the vehicle steering apparatus shown in FIG. 1.
Figure 11:
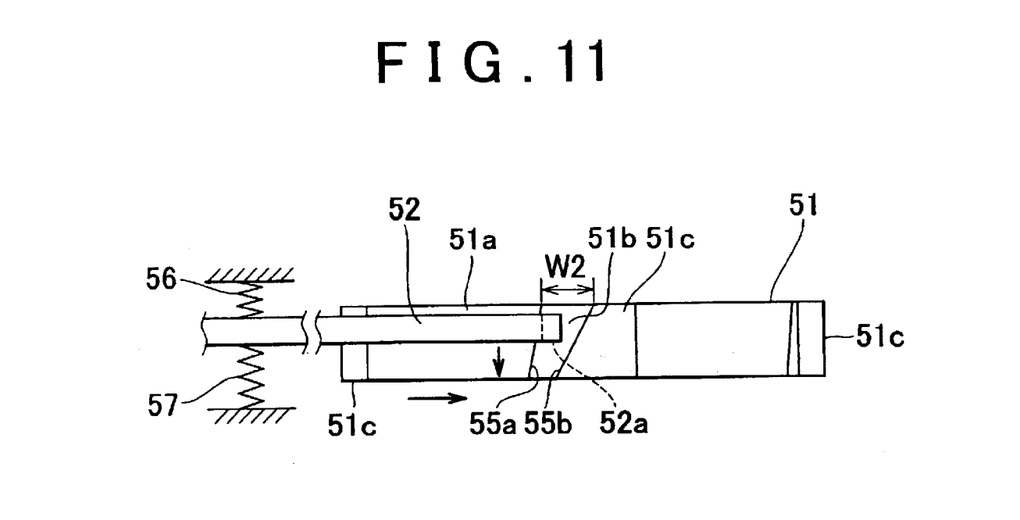
FIG. 11 is an explanatory view of the vehicle steering apparatus according to the third exemplary embodiment.

FIG. 11 is a view of the lock holder in the vehicle steering apparatus according to the third exemplary embodiment as seen from the side (i.e., the direction of arrow A in FIG. 8). As shown in FIG. 11, the lock arm 52 is engaged with the second indented portion 51b of the lock holder 51, with the engaging portion 52a of the lock arm 52 being inserted into the second indented portion 51b.

The second indented portion 51b is such that the opening width W2 in the circumferential direction gradually becomes narrower in the axial direction of the rotating shaft 33 of the motor 30. For example, side wall faces 55a and 55b of the second indented portion 51b are each formed at an angle with respect to the axial direction so that they are not parallel to each other.

The lock arm 52 is movably supported in the axial direction. For example, the lock arm 52 is urged by two springs 56 and 57 and pressed from both sides, and is moveable in the axial direction.

In this way, when the lock arm 52 is engaged with the second indented portion 51b, the lock holder 51 is rotated in a predetermined direction (i.e., in FIG. 11, the left side of the lock holder 51 moves to the right and the right side of the lock holder 51 moves around in a direction to the back of the drawing) by driving the motor 30. As a result, the engaging portion 52a of the lock arm 52 abuts against one side wall face 55a of the second indented portion 51b. Rotation of the lock holder 51 then moves the engaging portion 52a toward the narrow portion of the second indented portion 51b (i.e., downward in FIG. 11).

Figure 12:
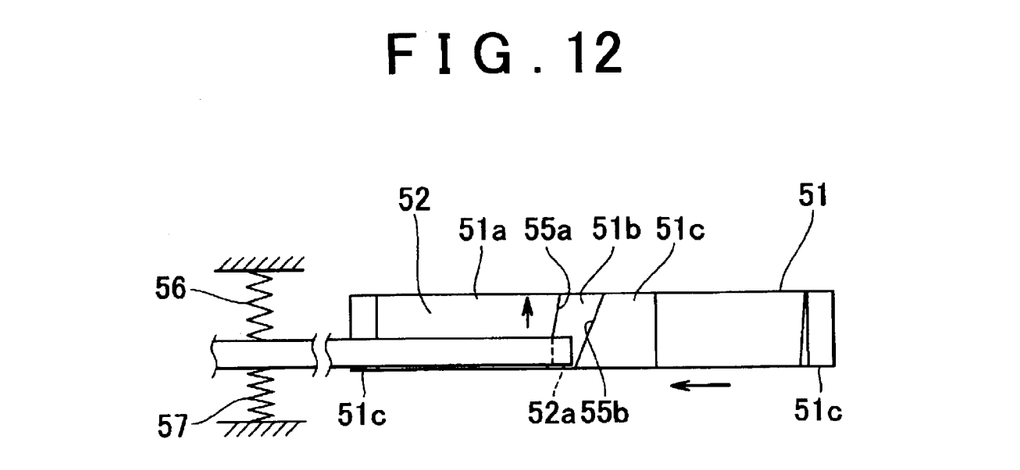
FIG. 12 is an explanatory view of the vehicle steering apparatus according to the third exemplary embodiment.

Accordingly, the lock arm 52 fits into the second indented portion 51b with little play, as shown in FIG. 12. This wedge effect makes it possible to engage the lock arm 52 with the lock holder 51 and lock them together so that there is little play between them.

On the other hand, in the state shown in FIG. 12, the lock holder 51 is rotated in the opposite direction (i.e., the left side of the lock holder 51 moves around in a direction to the back of the drawing) and the right side of the lock holder 51 moves to the left) by driving the motor 30. As a result, the engaging portion 52a of the lock arm 52 abuts against the other side wall face 55b of the second indented portion 51b. Rotation of the lock holder 51 then moves the engaging portion 52a toward the wide portion of the second indented portion 51b (i.e., upward in FIG. 11).

Accordingly, engaging portion 52a fits into the second indented portion 51b with a large degree of play, thereby facilitating release of the lock arm 52.

As described above, in addition to the effects of the vehicle steering apparatuses according to the first and second exemplary embodiments, the vehicle steering apparatus according to the third exemplary embodiment also enables the lock arm 52 and the lock holder 51 to be engaged and locked with a small degree of play by rotating the lock holder 51 while the lock arm 52 is engaged with the second indented portion 51b. Furthermore, disengagement of the lock arm 52 from the lock holder 51 is able to be facilitated by rotating the lock holder 51 in the opposite direction.

According to the first to the third exemplary embodiments described herein, the engaging member which is engages with the first indented portion can further be engaged with the second indented portion by forming the second indented portion at one end portion of the first indented portion of the lock holder. As a result, it is possible to reliably detect the position of the engaging member in the first indented portion, and thereby perform appropriate steering control.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A vehicle steering apparatus comprising:
   a variable gear ratio device having an input shaft coupled to a steering wheel side and an output shaft coupled to a steered wheel side, which changes a ratio of an angle input to the input shaft and an angle output to the output shaft by rotation of a motor, and
   a lock mechanism which restricts relative rotation of the input shaft and the output shaft, the lock mechanism including i) a lock holder which is provided on a rotor side of the motor and rotates together with the rotor, and which has a plurality of first indented portions formed in a circumferential direction along a circumference thereof, and a second indented portion, which is indented even deeper than the first indented portion and is formed at one end portion of each of the first indented portions; and ii) an engaging member which is provided on a stator side of the motor and is able to move close to and away from the lock holder, and which engages with one of the first indented portions or one of the second indented portions of the lock holder when the engaging member is operated so as to move close to the lock holder.

2. The apparatus according to claim 1, further comprising:
   a rotation detecting device which detects a rotational position of a rotating shaft of the motor, wherein the engaging member is engaged with the first indented portion such that play therebetween is allowed to a degree where output from the rotation detecting device changes.

3. The apparatus according to claim 2, wherein the rotation detecting device repeatedly outputs a plurality of different signals as the motor rotates, and an angle of the play when the engaging member is engaged with the first indented portion is at most a rotational angle of the motor that is necessary for all of the plurality of different signals to be output by the rotation detecting device.

4. The apparatus according to claim 3, wherein the rotation detecting device outputs the plurality of different signals a plurality of times while the motor rotates 360 degrees.

5. The apparatus according to claim 3, wherein the motor is driven when the engaging member is engaged with the first indented portion or the second indented portion, and the apparatus detects a positional relationship between the engaging member and the lock holder based on the output signal from the rotation detecting device at that time.

6. The apparatus according to claim 5, wherein when the engaging member is engaged with the first indented portion or the second indented portion, the motor is rotated as far as possible first in a certain direction and then as far as possible in the opposite direction, and the apparatus determines that the engaging member is engaged with the second indented portion when a number of changes in an output pattern of the rotation detecting device when the motor is rotated in the opposite direction is less than a predetermined number.

7. The apparatus according to claim 5, wherein when the engaging member is engaged with the first indented portion or the second indented portion, the motor is rotated as far as possible first in a certain direction and then in the opposite direction, and the apparatus determines that the engaging member is engaged with the first indented portion when a number of changes in the output pattern of the rotation detecting device when the motor is rotated in the opposite direction is equal to, or greater than, than a predetermined number.

8. The apparatus according to claim 3, wherein at least one of the second indented portions of the lock holder is such that an opening width in the circumferential direction thereof differs from the opening width of another second indented portion, and the motor is driven when the engaging member is engaged with the second indented portion, and the apparatus detects the engaging position of the engaging member based on the output signal from the rotation detecting device at that time.

9. The apparatus according to claim 8, wherein the opening widths of the second indented portions are all different.

10. The apparatus according to claim 2, wherein the motor is driven when the engaging member is engaged with the first indented portion or the second indented portion, and the apparatus detects a positional relationship of the engaging portion and the lock holder based on an output value of the rotation detecting device at that time.

11. The apparatus according to claim 10, wherein when the engaging member is engaged with the first indented portion or the second indented portion, the motor is rotated as far as possible first in a certain direction and then as far as possible in the opposite direction, and the apparatus determines that the engaging member is engaged with the second indented portion when a change in the output value of the rotation detecting device when the motor is rotated in the opposite direction is less than a predetermined value.

12. The apparatus according to claim 10, wherein when the engaging member is engaged with the first indented portion or the second indented portion, the motor is rotated as far as possible first in a certain direction and then in the opposite direction, and the apparatus determines that the engaging member is engaged with the first indented portion when a change in the output value of the rotation detecting device when the motor is rotated in the opposite direction is equal to, or greater than, a predetermined value.

13. The apparatus according to claim 10, wherein at least one of the second indented portions of the lock holder is such that an opening width in the circumferential direction thereof differs from an opening width of another second indented portion, and the motor is driven when the engaging member is engaged with the second indented portion, and the apparatus detects an engaging position of the engaging member based on the output value of the rotation detecting device at that time.

14. The apparatus according to claim 13, wherein the opening widths of the second indented portions are all different.

15. The apparatus according to claim 10, wherein the rotation detecting device is unable to detect a predetermined rotational angle of the rotating shaft, and is provided with respect to the lock holder so that undetectable rotational angle is set outside of a rotational range within which the engaging member engages with the second indented portion of the lock holder.

16. The apparatus according to claim 1, wherein the second indented portion of the lock holder is such that an opening width thereof in the circumferential direction gradually becomes narrower in the axial direction of rotation of the lock holder, and, when the engaging member is engaged with the second indented portion, the engaging member moves in a direction in which the opening width of the second indented portion narrows in the axial direction as the lock holder rotates.

17. The apparatus according to claim 1, wherein the engaging member is coupled to the steering wheel via the input shaft, and the lock holder is coupled to the rotating shaft.

18. A vehicle steering apparatus comprising:

variable gear ratio means, which has an input shaft coupled to a steering wheel side and an output shaft coupled to a steered wheel side, for changing a ratio of an angle input to the input shaft and an angle output to the output shaft by rotation of a motor, and a lock mechanism which restricts relative rotation of the input shaft and the output shaft, the lock mechanism including i) a lock holder which is provided on a rotor side of the motor and rotates together with the rotor, and which has a plurality of first indented portions formed in a circumferential direction along a circumference thereof, and a second indented portion, which is indented even deeper than the first indented portion and is formed at one end portion of each of the first indented portions; and ii) an engaging member which is provided on a stator side of the motor and is able to move close to and away from the lock holder, and which engages with one of the first indented portions or one of the second indented portions of the lock holder when the engaging member is operated so as to move close to the lock holder.

* * * * *